235-379 SR
2/26/85 OR 4,501,957

United States Patent [19]

Perlman et al.

[11] Patent Number: 4,501,957

[45] Date of Patent: Feb. 26, 1985

[54] VERIFIER FOR A PERSONAL INDENTIFICATION SYSTEM

[75] Inventors: Marvin Perlman, Granada Hills; Milton Goldfine, La-Crescenta, both of Calif.

[73] Assignee: Trans-Cryption, Inc., La-Crescenta, Calif.

[21] Appl. No.: 445,915

[22] Filed: Dec. 1, 1982

Related U.S. Application Data

[63] Continuation-in-part of Ser. No. 229,085, Jan. 28, 1981, Pat. No. 4,376,279.

[51] Int. Cl.[3] .......... H04L 9/00

[52] U.S. Cl. .......... 235/379; 235/380; 235/381; 340/825.34

[58] Field of Search .......... 235/379, 380, 381, 382; 340/825.34

[56] References Cited

U.S. PATENT DOCUMENTS

| | | | |
|---|---|---|---|
| 4,288,659 | 9/1981 | Atalla | 178/22.08 |
| 4,304,990 | 12/1981 | Atalla | 235/380 |
| 4,328,414 | 5/1982 | Atalla | 235/380 |
| 4,357,529 | 11/1982 | Atalla | 235/380 |

OTHER PUBLICATIONS

IBM Tech. Disclosure Bul., vol. 25, No. 5, Oct. 1982, p. 2358, Lennon, Matyas, Meyer.

*Primary Examiner*—Gene Z. Rubinson
*Assistant Examiner*—Robert Lev
*Attorney, Agent, or Firm*—Marvin H. Kleinberg

[57] ABSTRACT

A verifier for use in a personal identification system of the type in which a generator receives at least a personal account number (PAN) and a secret personal identification number (PIN) and based thereon produces digits $A_i$'s which are present in a feedback shift register (FSR) A and digits $C_i$'s present in a feedback shift register (FSR) C respectively. The $A_i$'s and $C_i$'s are mapped into $D_i$'s which represent digits of an Offset Number which together with the PAN are recorded on the magnetic stripe of a card. To use the cards the Offset Number and the PAN are read off therefrom and an intended user enters a secret PIN. In the verifier, the PIN is operated upon to produce $C_i$'s and the PAN is operated upon to produce $A_i$'s. The latter together with the $D_i$'s of the received Offset Number are mapped by a processer (201) to form $C_i^c$'s. These are compared with the $C_i$'s by a comparator (202) to determine whether the intended card user is the rightful user.

11 Claims, 10 Drawing Figures

| | | | LINE |
|---|---|---|---|
| FSR A | $A_1 A_2 A_3 A_4 A_5 A_6 A_7 A_8 A_9 A_{10}$ ($A_i$'s) | = 3 7 0 4 9 0 2 4 8 7 | a |
| FSR C | $C_1 C_2 C_3 C_4 C_5 C_6 C_7 C_8 C_9 C_{10}$ ($C_i$'s) | = 8 1 0 3 6 6 1 9 3 1 | b |
| COMPUTED | $D_1 D_2 D_3 D_4 D_5 D_6 D_7 D_8 D_9 D_{10}$ ($D_i$'s) | = 9 0 7 3 4 0 7 1 8 0 | c |

FIG. 3

FIG. 4

| $A_i$ \ $C_i$ | 0 | 1 | 2 | 3 | 4 | 5 | 6 | 7 | 8 | 9 |
|---|---|---|---|---|---|---|---|---|---|---|
| 0 | 7 | 6 | 5 | 2 | 9 | 1 | 0 | 8 | 4 | 3 |
| 1 | 5 | 1 | 0 | 6 | 7 | 2 | 8 | 9 | 3 | 4 |
| 2 | 2 | 7 | 3 | 9 | 4 | 0 | 6 | 1 | 8 | 5 |
| 3 | 0 | 4 | 8 | 5 | 1 | 3 | 2 | 6 | 9 | 7 |
| 4 | 8 | 5 | 2 | 3 | 6 | 7 | 9 | 4 | 0 | 1 |
| 5 | 1 | 8 | 6 | 0 | 2 | 4 | 7 | 3 | 5 | 9 |
| 6 | 6 | 3 | 7 | 4 | 8 | 9 | 5 | 2 | 1 | 0 |
| 7 | 4 | 0 | 9 | 1 | 5 | 6 | 3 | 7 | 2 | 8 |
| 8 | 9 | 2 | 4 | 8 | 3 | 5 | 1 | 0 | 7 | 6 |
| 9 | 3 | 9 | 1 | 7 | 0 | 8 | 4 | 5 | 6 | 2 |

$D_i = A_i * C_i$

FIG. 5

| | | | LINE |
|---|---|---|---|
| FSR C | $C_1 C_2 C_3 C_4 C_5 C_6 C_7 C_8 C_9 C_{10}$ | = 8 1 0 3 6 6 1 9 3 1 | a |
| FSR A | $A_1 A_2 A_3 A_4 A_5 A_6 A_7 A_8 A_9 A_{10}$ | = 3 7 0 4 9 0 2 4 8 7 | b |
| STORED | $D_1 D_2 D_3 D_4 D_5 D_6 D_7 D_8 D_9 D_{10}$ | = 9 0 7 3 4 0 7 1 8 0 | c |
| COMPUTED | $C_1^c C_2^c C_3^c C_4^c C_5^c C_6^c C_7^c C_8^c C_9^c C_{10}^c$ ($C_i^c$'s) | = 8 1 0 3 6 6 1 9 3 1 | d |

| $A_i$ \ $D_i$ | 0 | 1 | 2 | 3 | 4 | 5 | 6 | 7 | 8 | 9 |
|---|---|---|---|---|---|---|---|---|---|---|
| 0 | 6 | 5 | 3 | 9 | 8 | 2 | 1 | 0 | 7 | 4 |
| 1 | 2 | 1 | 5 | 8 | 9 | 0 | 3 | 4 | 6 | 7 |
| 2 | 5 | 7 | 0 | 2 | 4 | 9 | 6 | 1 | 8 | 3 |
| 3 | 0 | 4 | 6 | 5 | 1 | 3 | 7 | 9 | 2 | 8 |
| 4 | 8 | 9 | 2 | 3 | 7 | 1 | 4 | 5 | 0 | 6 |
| 5 | 3 | 0 | 4 | 7 | 5 | 8 | 2 | 6 | 1 | 9 |
| 6 | 9 | 8 | 7 | 1 | 3 | 6 | 0 | 2 | 4 | 5 |
| 7 | 1 | 3 | 8 | 6 | 0 | 4 | 5 | 7 | 9 | 2 |
| 8 | 7 | 6 | 1 | 4 | 2 | 5 | 9 | 8 | 3 | 0 |
| 9 | 4 | 2 | 9 | 0 | 6 | 7 | 8 | 3 | 5 | 1 |

$C_i^c = A_i \circ D_i$

FIG. 8
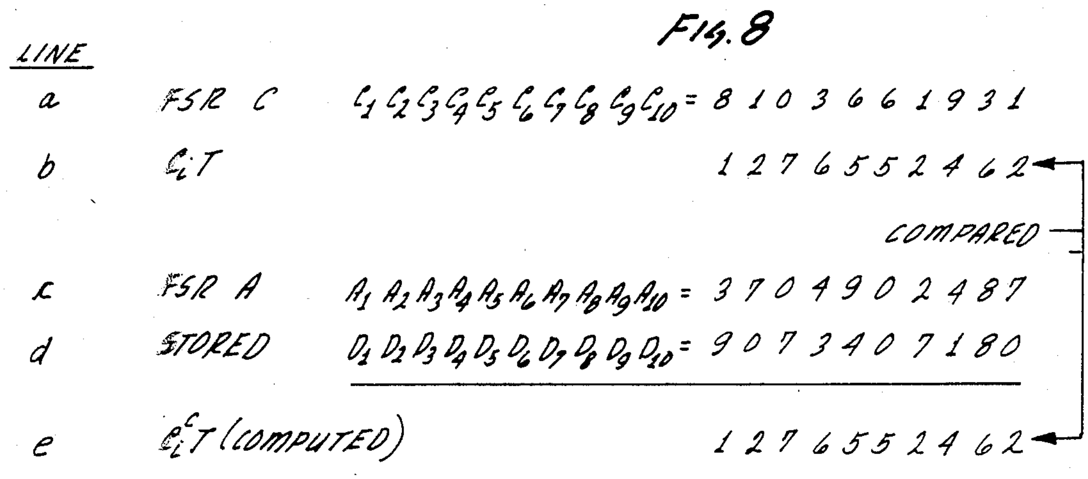
FIG. 9
| $A_i$ \ $D_i$ | 0 | 1 | 2 | 3 | 4 | 5 | 6 | 7 | 8 | 9 |
|---|---|---|---|---|---|---|---|---|---|---|
| 0 | 5 | 3 | 6 | 4 | 1 | 8 | 2 | 7 | 9 | 0 |
| 1 | 8 | 2 | 3 | 1 | 4 | 7 | 6 | 0 | 5 | 9 |
| 2 | 3 | 9 | 7 | 8 | 0 | 4 | 5 | 2 | 1 | 6 |
| 3 | 7 | 0 | 5 | 3 | 2 | 6 | 9 | 4 | 8 | 1 |
| 4 | 1 | 4 | 8 | 6 | 9 | 2 | 0 | 3 | 7 | 5 |
| 5 | 6 | 7 | 0 | 9 | 3 | 1 | 8 | 5 | 2 | 4 |
| 6 | 4 | 1 | 9 | 2 | 6 | 5 | 7 | 8 | 0 | 3 |
| 7 | 2 | 6 | 1 | 5 | 7 | 0 | 3 | 9 | 4 | 8 |
| 8 | 9 | 5 | 2 | 0 | 8 | 3 | 4 | 1 | 6 | 7 |
| 9 | 0 | 8 | 4 | 7 | 5 | 9 | 1 | 6 | 3 | 2 |
$C_i^C T = A_i \otimes D_i = (A_i \circ D_i)T$
FIG. 10
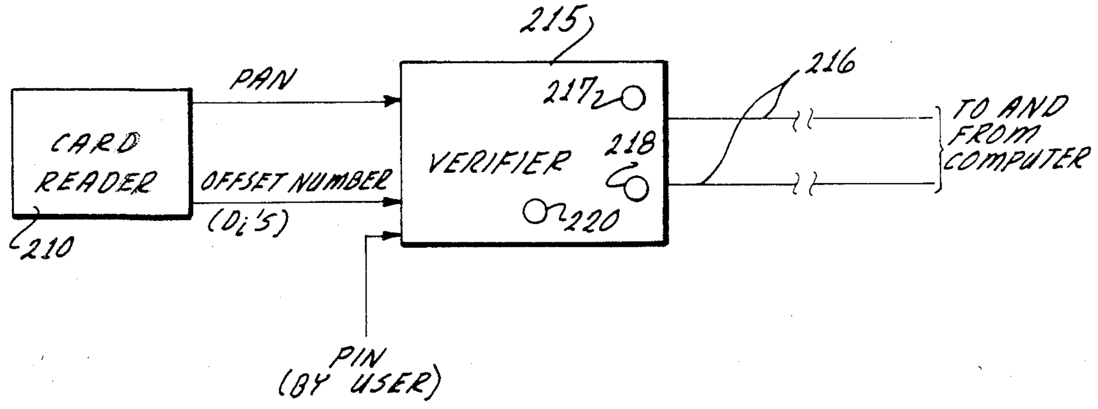

VERIFIER FOR A PERSONAL INDENTIFICATION SYSTEM

REFERENCE TO PRIOR APPLICATIONS

This application is a continuation-in-part of application Ser. No. 229,085, filed on Jan. 28, 1981 now U.S. Pat. No. 4,376,279, issued Mar. 8, 1983.

BACKGROUND OF THE INVENTION

1. Field of the Invention

The present invention relates to a Personal Identification System and, more particularly, to an improved arrangement in the verification position of such a system.

2. Description of the Prior Art

In U.S. patent application Ser. No. 229,085 filed on Jan. 28, 1982, an advanced Personal Identification System is described. The application entitled "Personal Identification System" was filed by the inventors Marvin Perlman and Milton Goldfine and assigned to the same assignee as the present application.

Briefly, the system described in said application comprises a generator which generates an Offset Number which is recorded on the magnetic stripe of a card, together with the account number (PAN) of the person to whom the card is to be issued. The generator stores transformed digits of a sequence of digits (IN) which have been secretly entered by one or more officers of the card-issuing institution. To generate the Offset Number the PAN is entered and transformed before initializing a first feedback shift register. The person to whom the card is to be issued enters a secretly chosen alphanumeric sequence (PIN), known only to him. The PIN, after undergoing a transformation initializes a second feedback shift register. When both registers have been initialized they are reinitialized by different parts of the representation of different digits of the transformed IN. The contents of a subset of the stages of the two registers are used to initialize a control feedback shift register which when reaching a selected state in its cycle of states assumes the timing and control of the generator during the derivation of the Offset Number, based on a selected mapping of the digits, then present, in the first and second feedback shift registers.

A credit card is entered into a verifier at the inception of a validation test of identity. Therein the PAN and Offset Number on the magnetic stripe on the card are read out. The user enters a secret PIN, and the verifier, like the generator, generates an Offset Number. Only if the PIN, entered into the verifier, is identical to that originally entered into the generator, does the verifier produce an Offset Number which is identical to that read off the card, thereby verifying the identity of the card user as the one to whom the card was issued.

The above described system, as disclosed in said application, represents a very significant break through in the state of the art in that it provides a higher degree of security than any attainable with any prior art system. However, as herebefore described, the verifier, to a very large degree, operates as the generator in that, like the generator, it generates an Offset Number. In addition, the verifier compares the Offset Number it generates with the one, present on the card's magnetic stripe, and only when the two are identical is an indication given that the person who entered the secret PIN has been identified as the rightful user of the card.

It is believed that an added degree of security may be achieved if the verifier were to operate in a mode different from that of the generator. This is partially based on the fact that whereas each generator will be located in a very secure location, where cards are to be issued, verifiers, however, will be present and transportable in the many thousands of establishments where cards can be used. Thus verifiers are accessible to unscrupulous people who may try to determine how the original generators produce valid PAN-PIN-OFFSET combinations. As described in said application, the verifier contains portions which make it practically impossible for one to open the verifier and completely analyze its mode of operation, and thereby determine the operation of the generator. It is believed, however, that an added degree of security may be attained by designing the verifier so that it does not mimic the behavior of the generator.

SUMMARY OF THE INVENTION

In accordance with the present, just like in the prior application, the Offset Number together with the PAN are read off the card and fed to the verifier. The latter is also supplied with the secret PIN which the card user supplies. The PIN and PAN together with the digits of any Institution Number (IN) are processed so that feedback shift registers A and C store digits $A_1$, $A_2$—An and $C_1$, $C_2$—$C_n$, generally referred to in the prior application as $A_i$ and $C_i$. The digits of the Offset Number are designated $D_i$. In the prior application, when the feedback shift register B (See FIGS. 1 and 12) realizes a particular state, a decoder 40 (See FIG. 12) sensing that state actuates a processor 45 (See FIG. 12). The latter sequentially combines the $A_i$'s and the $C_i$'s in accordance with a preselected processing function to generate and produce the $D_i$'s of the Offset Number, which are then compared with the $D_i$'s which were read off the card and stored in the verifier.

In accordance with the present invention, the $C_i$'s are derived in the same manner as described in the prior application. However, instead of mapping them with the $A_i$'s to produce the $D_i$'s, the derived $A_i$'s and the stored $D_i$'s are mapped into a set of computed digits, generally designated as $C_i^c$'s where the superscript c designates computed $C_i$'s, as the result of the mapping of the derived $A_i$'s and the stored $D_i$'s. The derived $C_i$'s and the computed $C_i^c$'s are compared and only when they are identical is an indication given that the one who entered the secret PIN is the rightful card user. Thus, in the improved verifier an Offset Number, like the one stored on the card, is never generated.

Briefly stated, in the new improved verifier, $C_i$'s are derived as a function of PIN, as in the generator. Also $A_i$'s are derived as a function of PAN, as in the generator. However, whereas in the prior verifier the $A_i$'s and $C_i$'s are mapped into $D_i$'s which are the Offset Number, which is compared with the $D_i$'s of the Offset Number recorded on the card, in the present verifier the $D_i$'s of the Offset Number are mapped with the $A_i$'s into $C_i^c$'s which are compared with the $C_i$'s actually derived in the verifier, from the secretly entered PIN.

The novel features of the invention are set forth with particularity in the appended claims. The invention will be best understood from the following description when read in conjunction with the accompanying drawings.

BRIEF DESCRIPTION OF THE FIGURES

FIG. 3 is a multiline diagram of $A_i$'s and $C_i$'s used in the generator to form $D_i$'s of the Offset Number;

FIG. 4 is a diagram of a Latin Square to map the $A_i$'s and $C_i$'s into the $D_i$'s;

FIG. 5 is a multiline diagram showing one example of mapped $A_i$'s and $D_i$'s into $C_i^c$'s;

FIG. 6 is a Latin Square to produce to mapping of the $A_i$'s and $D_i$'s into the $C_i^c$'s;

FIGS. 7, 8 and 9 are diagrams useful in explaining other embodiment of the invention;

FIG. 10 is a block diagram useful in explaining another advantage of the invention.

DETAILED DESCRIPTION OF THE PREFERRED EMBODIMENTS

The present application incorporates by reference the description in patent application which matured into U.S. Pat. No. 4,376,279, issuing on Mar. 8, 1983. Ser. No. 229,085 filed on Jan. 28, 1981, by the applicants of the present application and assigned to the same assignee, said application being deemed as fully set out and described herein.

Figure 1:
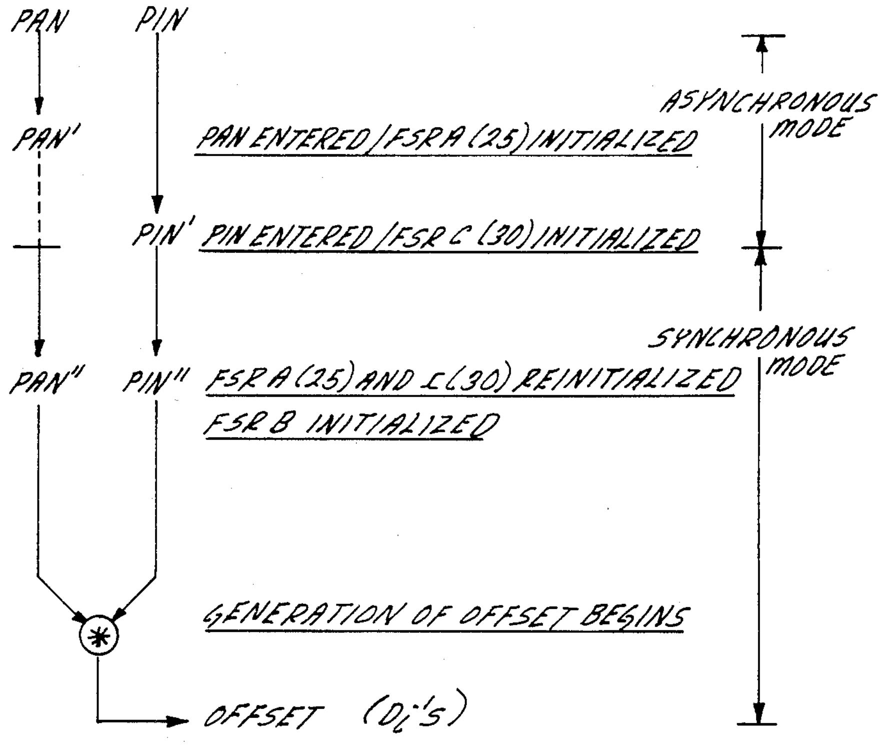
FIG. 1 is a flow chart type diagram useful in explaining the generation of one Offset Number in a generator.

The manner of generating the Offset Number in the generator as well as in the verifier described in the prior application may best be summarized in connection with FIG. 1. Therein and in the other figures when referring to various parts of prior application (PA) will also be used in the present application.

Briefly in the generator 10 (see PA FIG. 1) the PAN is entered into and effectively initializes FSR A, the contents of which are designated by PAN'. Similarly, PIN is entered and effectively initializes FSR C, the contents of which are designated PIN'. These operations are performed asynchronously. When both FSR A AND FSR C have been initialized, the system enters a synchronous mode, during which both FSR A AND FSR C are reinitialized, such as by selected portions of the representation of digits of the Institution Number (IN) in the IN STORAGE 15. The reinitialized PAN and PIN are designated by PAN" and PIN", respectively. The stages of FSR B (35 & 95) are then initialized. The FSR's A,B and C are clocked and assume successive states, until FSR B reaches a selected state. Thereafter, during a succession of clock periods the $C_i$'s in FSR C and corresponding $A_i$'s in FSR A are mapped to generate the $D_i$'s, which from the Offset Number, which is recorded on the card. That is, $D_i = A_i * C_i$. The mapping is provided by processor 45 (See PA FIGS. 1 & 12).

As pointed out in the prior application, the mapping may be a Latin Square, as shown in FIG. 13 of the prior application. Therein a $10 \times 10$ Latin Square is shown. As also pointed out in the prior application, the number of possible $10 \times 10$ Latin Squares has not been computed as yet. The number of $9 \times 9$ Latin Squares is known to be greater than $3.7 \times 10^{17}$ (See PA FIG. 40).

The verifier, described in the prior application, generates $D_i$'s just like the generator. Once the $D_i$'s are generated in the verifier, they are correspondingly compared with those read off the card.

Figure 2:
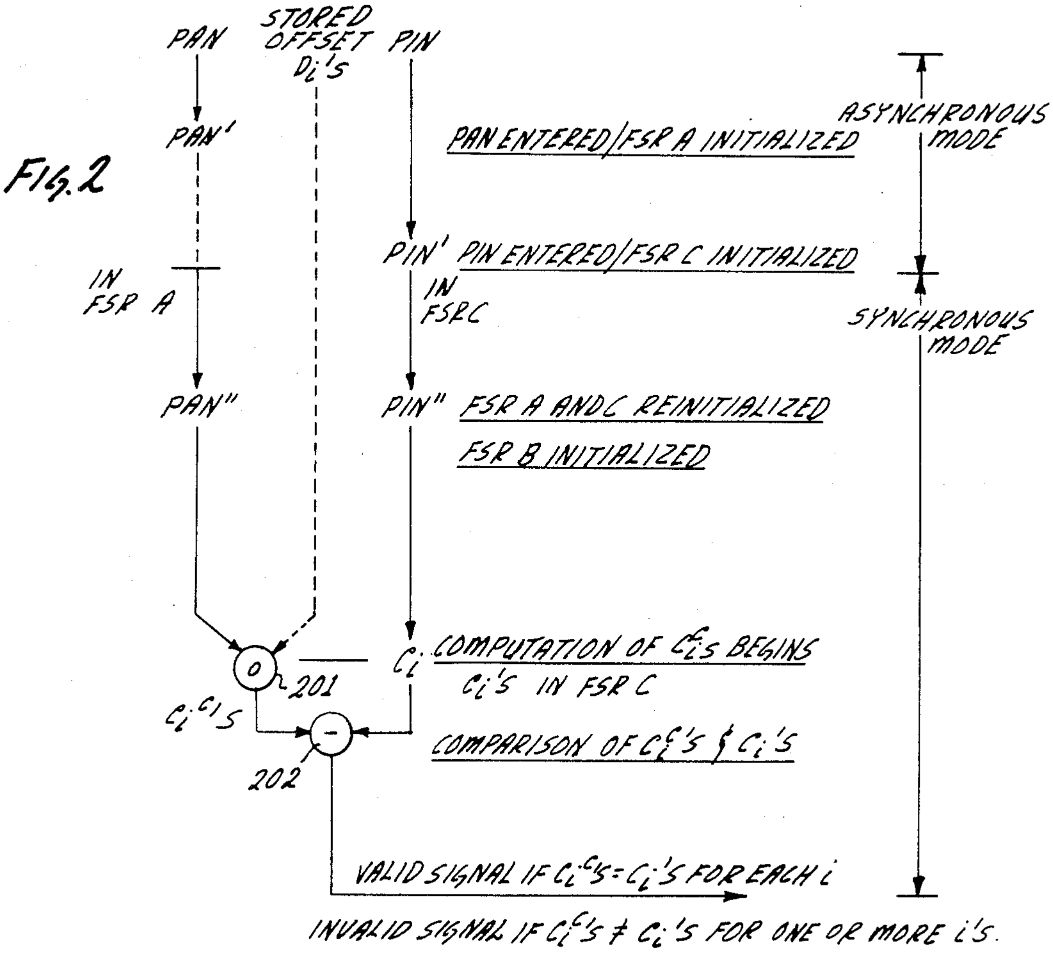
FIG. 2 is a flow chart type diagram useful in explaining the operation of one embodiment of the improved verifier.

Unlike the prior verifier, with an arrangement in accordance with the present invention, $D_i$'s are never generated in the verifier, for comparison with corresponding $D_i$'s which were recorded on the card. The mode of operation in one embodiment of the improved verifier may best be explained in connection with FIG. 2. As shown therein, the $D_i$'s of the Offset Number are read off the card and temporarily stored in the verifier. The PAN which is read off the card effectively initializes FSR A to form PAN'. Likewise the PIN, which the user secretly enters into the verifier, effectively initializes FSR C to form PIN'. Then, both FSR A and FSR C are reinitialized to form PAN" and PIN", respectively. The FSR B is effectively initialized by portions of PIN" and PAN". Then FSR's A, B and C are clocked synchronously until FSR B reaches the particular state, which is sensed by the decoder 40 (See PA FIG. 12). At this point the contents of FSR A i.e. the $A_i$'s and the stored $D_i$'s, are mapped by a processor 201 to form computed $C_i$'s, hereafter referred to as $C_i^c$'s. They are subsequently compared with the corresponding derived $C_i$'s in FSR C by a comparator 202. Only when corresponding $C_i^c$'s and $C_i$'s are identical is a valid signal provided, thereby indicating that the user who entered the secret PIN into the verifier is the rightful user. On the other hand if one or more corresponding $C_i^c$'s and $C_i$'s are not identical, an invalid signal is produced.

The foregoing may further be explained in connection with a specific example. Let it be assumed that in the generator, the state of FSR B is decoded by decoder 40 (See PA FIG. 12) and such state indicates that the processor 45 should be activated to map the $A_i$'s in FSR A and the $C_i$'s in FSR C and that the $A_i$'s and $C_i$'s are as shown in lines a and b of FIG. 3. Let it further be assumed that processor 45 provides a mapping, based on the Latin Square shown in FIG. 4. That is, $D_i = A_i * C_i$. It should be apparent that the $D_i$'s of the Offset Number would be as shown in line c of FIG. 3. These $D_i$'s are recorded on the magnetic stripe of the card.

Figures 6, 7:
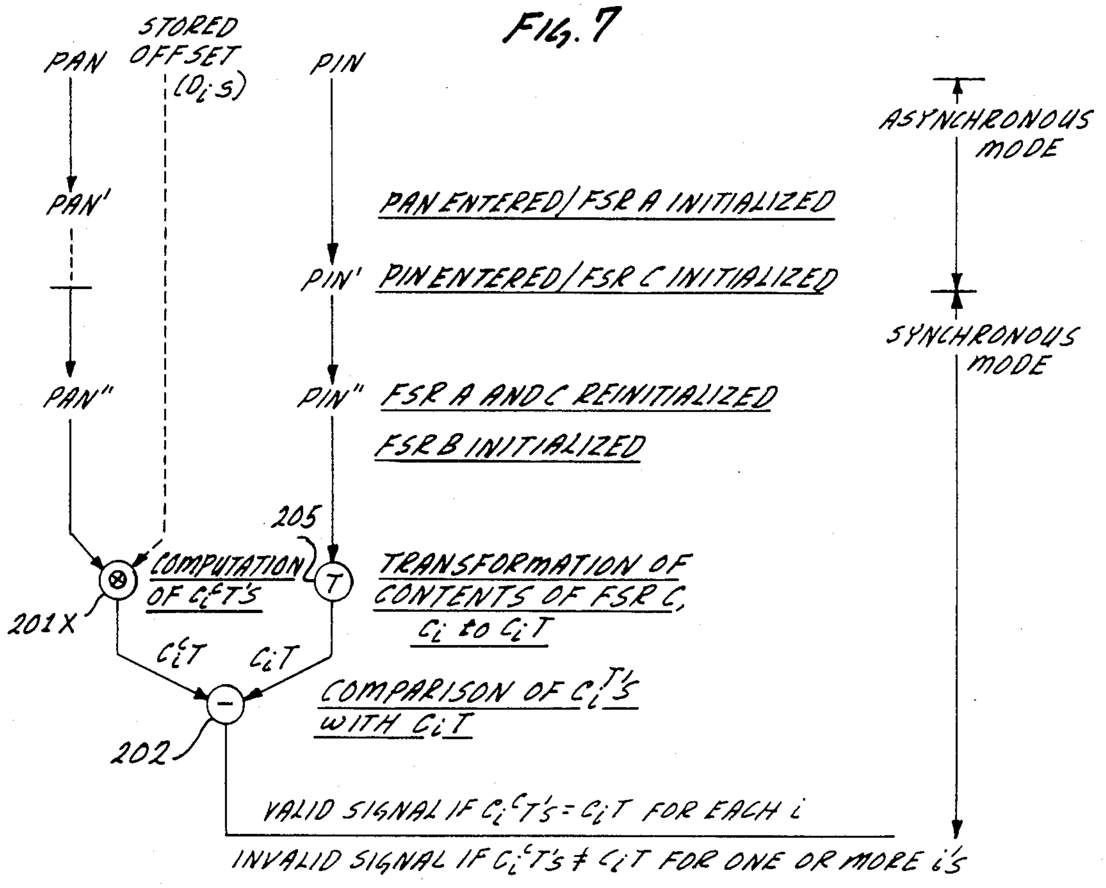

As to the verifier, these $D_i$'s are stored therein, as shown in line c of FIG. 5. In the verifier the $A_i$'s and $C_i$'s are generated as they were in the generator. They are shown in lines b and a, respectively of FIG. 5. As to the processor 201 (See FIG. 2) as previously pointed out, it maps corresponding $A_i$'s and the stored $D_i$'s into the $C_i^c$'s. The processor 201 produces a mapping based on a preselected Latin Square which is related to the Latin Square in the processor 45 of the generator. Such a Latin Square in processor 201 is shown in FIG. 6. With such a Latin Square, the mapping can be expressed as $C_i^c = A_i \circ D_i$, resulting in computed $C_i^c$'s as shown in line d of FIG. 5, at the time the $C_i^c$'s are produced. $C_i$'s are present in FSR C, as shown in line a of FIG. 5.

The comparator 202 (See FIG. 2) compares each $C_i$ with a corresponding $C_i^c$. Only if respective components are identical, does the comparator 202 produce a valid signal. The $C_i$'s (line a of FIG. 5) do not match corresponding $C_i^c$'s whenever the PIN which was entered is not the correct secret PIN. Thus, the comparator produces an invalid signal.

To further increase the security provided by the system, traps may be introduced in the verifier to prevent unauthorized use of the system. For example, the $C_i$'s generated in the verifier as a function of PIN may undergo a transformation T in a transformation unit 205

(See FIG. 7). Let it be assumed that the transformation is as follows:

| digit | 0 | 1 | 2 | 3 | 4 | 5 | 6 | 7 | 8 | 9 |
|---|---|---|---|---|---|---|---|---|---|---|
| T transformed digit | 7 | 2 | 8 | 6 | 0 | 3 | 5 | 9 | 1 | 4 |

Thus comparator 202 (FIG. 7) will no longer be provided with $C_i$'s but rather with transformed $C_i$'s, designated $C_iT$'s. Let it be assumed that in the following example the $A_i$'s, $C_i$'s and $D_i$'s in the generator are the same as in the previous example, as shown in lines a, b and c, respectively, in FIG. 3. As to the verifier the $C_i$'s generated therein as a function of a correct PIN would be the same, i.e. 8 1 0 3 6 6 1 9 3 1, as shown in line a of FIG. 8. However, after undergoing the transformation T the $C_i$'s are converted into the $C_iT$'s as shown in line b.

The $A_i$'s, produced in the verifier, and the stored $D_i$'s which were read off the card are mapped by processor 201*x*, which is similar to processor 201, heretofore described. However, its output, i.e. the $C_i^c$'s, have to be compared not with corresponding $C_i$'s, but with corresponding transformed $C_i$'s, namely with $C_iT$'s. Therefore, a Latin Square, different from that shown in FIG. 6, must be employed to account for the transformation of the $C_i$'s, into $C_iT$'s. Such a Latin Square is shown in FIG. 9. Its mapping can be expressed as $C_i^cT = A_i{}^{\bullet}D_i = (A_i{}^{\circ}D_i)T$ to account for the transformation of the $C_i$'s in te verifier, as shown in line a of FIG. 8 into the $C_iT$'s, as shown in line b. The $A_i$'s and $D_i$'s are unaffected as shown in lines c and d. Also, once mapped by processor 201*x*, the output would be $C_i^cT$'s, as shown in line e. It is the $C_i^cT$'s which are compared with the corresponding $C_iT$'s by comparator 202.

It should be stressed that in either embodiment, the verifier never generates an Offset Number to be compared with that on the card. Rather the digits of the Offset Number (the $D_i$'s) which are supplied to the verifier are mapped with the $A_i$'s, derived therein as a function of PAN, to produce $C_i^c$'s (or $C_i^cT$'s), which are compared, with corresponding $C_i$'s (or $C_iT$'s) to verify whether or not the one using the card is the rightful card owner.

At present, in establishments where cards are used, little, if any, effort is devoted to validate the identity of the card user. More often only the account status is checked to determine if charges can be made. To this end, establishments have a small unit with a keyboard. The proprietor enters the account number via a keyboard or it is read off from the card by a card reader. This number is then communicated to a computer wherein the status of all accounts are stored. An indication of the account status is sent back to the proprietor. However, it must be stressed that this procedure only checks the account status. It in no way validates the user's identity.

In accordance with an improved embodiment of the invention, the existing unit may be eliminated and its functions incorporated in the verifier, as diagrammed in FIG. 10. Therein numeral 210 designates a card reader which reads at least the PAN i.e. the $A_i$'s and the Offset Number i.e. the $D_i$'s and stores them into the verifier 215. Once the secret PIN is entered by the user, the verifier validates the identity of the user. Only if he (or she) is the rightful user will comparator 202 provide a valid signal ($C_i = C_i^c$ or $C_iT = C_i^cT$). Only a valid signal output from comparator 215 enables the automatic transmission of PAN, which is stored in the verifier, to a location wherein the status of all accounts are stored, e.g., a remotely located computer via lines 216. If the account status is good an appropriate indication is returned, e.g. a green light 217 is illuminated. On the other hand, if the account status is bad by one or more criteria, a red light 218 is turned on. It should be stressed, that the return indication corresponding to a good account status can be used as a secure enabling signal which permits the completion of the transaction.

It should be pointed out that the determination of the account status may be done at the same time the person's identity is being validated. However, since for each inquiry of account status the proprietor is charged a fee, it is preferable to determine the account status only after the identity of the card user has been validated.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A verifier for use in a personal identification system of the type in which a card is issued to a person by an entity with a personal assigned number, definable as PAN, which is recorded on the card, and a number definable as an Offset Number, which is also recorded on the card, said Offset Number being generated by a generator of said system as a function of at least said PAN and a secret code in the form of a digital sequence secretly chosen, by and known only by said person, definable as PIN, the verifier comprising:

first means for receiving said PAN and said Offset Number, recorded on said card, for processing said PAN and thereafter mapping said PAN and the digits of the Offset Number, definable as $D_i$'s, to provide a sequence of digits, definable as $C_i^c$'s;

second means for receiving a PIN from a person the identity of which is to be verified and for processing said PIN to provide a sequence of digits, definable as $C_i$'s; and comparing means for comparing corresponding $C_i^c$'s and $C_i$'s to provide a valid signal when $C_i^c\text{'s} = C_i\text{'s}$ for each i and for providing an invalid signal when $C_i^c\text{'s} \neq C_i\text{'s}$ for one or more i's.

2. A verifier as recited in claim 1 wherein said first means include feedback shift register means, definable as FSR A, and means for transforming the PAN into transformed digits, prior to storing them in said FSR A, and said second means include second feedback shift register means, definable as FSR C and means for transforming the PIN digits prior to storing them in said FSR C, said verifier further including third feedback shift register means definable as FSR B, means for clocking said FSR's A, B and C, means for initializing said FSR B with at least portions of digits in said FSR's A and C, said first means producing said $C_i^c$'s only during a sequence of clock periods following a selected sensed state of FSR B and said comparing means comparing said $C_i^c$'s with said $C_i$'s which are provided from FSR C during said sequence of clock periods.

3. A verifier as recited in claim 2 wherein said first means include mapping means for providing said $C_i^c$'s during said sequence of clock pulses by mapping $A_i$'s, provided by said FSR A during said sequence, with $D_i$'s stored in said verifier, whereby $C_i^c = A_i * D_i$, where * represents a mapping operation.

4. A verifier as recited in claim 3 wherein said mapping means include means for mapping said $A_i$'s and $D_i$'s based on a preselected criteria, which is related to mapping in the generator of the outputs of said FSR's A and C into the $D_i$'s, comprising said Offset Number.

5. A verifier as recited in claim 4 wherein the mapping is based on a Latin Square of n×n, where n is an integer.

6. A verifier as recited in claim 5 wherein $n = 10$.

7. A verifier as recited in claim 4 wherein said verifier includes transformation means for transforming the outputs of said FSR C, definable as $C_i$'s, into $C_iT$'s (corresponding to $C_i$ Transformed) and said mapping means includes means for mapping said $A_i$'s and $D_i$'s based on a preselected criteria which is related to mapping, in the generator, of the outputs of said FSR's A and C to generate the $D_i$'s, comprising said Offset Number and is further related to the transformation performed by said transformation means.

8. A verifier as recited in claim 7 wherein the mapping is based on a Latin Square of N×N where N is an integer.

9. A verifier as recited in claim 8 wherein $N = 10$.

10. A verifier as recited in claim 1 further including means for indicating whether said comparing means provides a valid signal or an invalid signal.

11. A verifier as recited in claim 1 further including means responsive to a valid signal from said comparing means for transmitting the PAN, received from a card, to a location whereat the status of accounts, including the account represented by said PAN, are present, and means in said verifier for enabling the transaction involving the use of said card to be completed only if a signal is received from said location, indicating that the status of the account, identified by said PAN, is good.

* * * * *